Patented Sept. 22, 1942

2,296,794

UNITED STATES PATENT OFFICE 2,296,794

PROCESS OF TREATING VEGETABLE OILS

Norman F. Kruse, Elmer B. Oberg, and Wendell E. Mann, Decatur, Henry R. Kraybill, West Lafayette, and Kenneth E. Eldridge, La Fayette, Ind., assignors of one-half to Central Soya Company, Inc., Fort Wayne, Ind., a corporation of Indiana, and one-half to Purdue Research Foundation, West Lafayette, Ind., a corporation of Indiana No Drawing. Application February 6, 1941, Serial No. 377,660

6 Claims. (Cl. 260—397.2)

It is the object of our invention to obtain a concentrated sterol fraction from vegetable oils, with more special reference to soybean oil; while at the same time refining or partially refining the oils.

GENERAL PROCESS

Our general process is as follows:

1. Start with a vegetable oil, most desirably a soybean oil. This oil may even be a crude vegetable oil, or the so-called high-acid oil obtained by acetone washings of crude vegetable phosphatides; but is more desirably a partially clarified oil, such as one which contains a relatively small amount of phosphatides, as is obtained by letting the crude oil stand for a while and then removing the settled-out matter, as by decanting, filtering, or centrifuging. As an example, of a soybean oil, such a partially clarified oil would show the following partial analysis:

|  | Per cent |
|---|---|
| Volatile | 0.10 |
| Phosphatides | 0.25 |
| Gardner break | 0.08 |

2. To the starting oil add a saponifying agent, such as sodium (or potassium) hydroxide, conveniently as a 10° to 14° Baumé solution for soybean oils, with constant stirring, and heat slowly to about 140° F. and hold there for about half an hour, continuing the stirring. The amount of added sodium hydroxide solution may vary, but in any case it is not enough to produce material saponification of the oil itself. Therefore, we desirably add enough and just about enough to neutralize (or saponify) the fatty acids and to precipitate the phosphatides, while leaving the oil unsaponified which usually requires about 0.06% to 0.10% actual NaOH in the case of soybean oils. Then add about 1% of an infusorial earth, (such as 'Dicalite' or 'Celite,') as a filter aid; cool to about 80° F., with continued stirring; and then separate the solid matter, as by filtering or centrifuging, desirably in a filter press, to obtain a filter cake. Desirably, the filter cake is well blown, so that it is freed from the greater part of adhering oil. The oil obtained from the centrifuging or filtering is unsaponified; and is a non-break oil, without further treatment.

3. The blown filter cake obtained by the filtering of step 2 is extracted with a suitable organic solvent for fats and oils, such for instance as petroleum ether, acetone, or metyl-ethyl ketone; which solvent for fats and oils also dissolves any sterols present. The extract thus obtained is separated from the solid residue, as by filtering, to leave behind mainly only the filter aid which was added. The solvent (say acetone) is then removed from the extract by evaporation, leaving behind an oily residue. This usually contains from between 2.0% and 4.5% of crude sterols in the case of soybean oils.

4. This oily residue is then treated to separate the sterols, in either of two ways:

a. By saponification of the oily residue, as with alcoholic KOH or NaOH, in the well-known way to convert all the oils to soaps in the alcoholic solution; in which soaps the sterols are somehow present, and from which they are removed by solvent extraction, as with ether or petroleum ether.

a'. A modification of a: By saponification as in a, with either aqueous or alcoholic KOH or NaOH, and then adding a porosity-increasing material, for which the so-called filter aids (such as infusorial earth or beet pulp or bran or wood pulp or paper pulp) are suitable; and then, after drying if desired, extracting with ether or petroleum ether, to dissolve out the sterols.

b. By extraction of the oily residue with an organic sterol-dissolving solvent (such as methanol or ethanol or propanol or isopropanol or ethylene glycol) which is substantially immiscible with the oil at least at lower temperatures, and either conducting such extraction at a temperature sufficiently low so that the solvent is substantially immiscible with the oil, or conducting it at a higher temperature followed by cooling to that temperature of substantial immiscibility. The maximum temperature for substantial immiscibility varies with the solvent—for methanol it is rather high, higher than room temperature, while for isopropanol it is only barely above 0° C. The solvent takes up the sterols, and a small part of the oil, and probably all or nearly all of any soaps (usually present in small amount) which may be present. The sterols are then in large part recovered as solids from the solvent in any of several ways—as by evaporating off part or all of the solvent, or by refrigerating, or by diluting with water or other sterol-precipitating liquid and then refrigerating, or by combinations of these procedures—to leave a residual oily mother liquor. By then saponifying this residual oily mother liquor (with either an alcoholic solution or a water solution of sodium or potassium hydroxide), the oil is converted into soap, and the sterols present are separated from the total soaps present by solvent extraction as in a.

b'. A modification of b: By proceeding as in $b$, but making the final step of saponification a saponification as in $a'$, followed by the further procedure of $a'$.

Example 1

The following is an example of our process as applied to a soybean oil.

We start with a centrifuged, settled, solvent-extracted soybean oil, say one which shows the same partial analysis as given at the bottom of paragraph 1 above under the heading "General Process." To 340 pounds of this soybean oil add 0.2 pound of actual sodium hydroxide in the form of a 14° Baumé solution, and while agitating thoroughly heat slowly to about 140° F. Hold at that temperature for about half an hour, continuing the stirring. The sodium hydroxide neutralizes (or saponifies) the free fatty acids, and precipitates the phosphatides; but is not sufficient in amount to saponify the oil. Then add 3.4 pounds of an infusorial-earth filter aid, conveniently the one known under the trade designation of 'Dicalite' Special Speedflow. While continuing to stir, cool to about 77° F.; and then filter the entire mass, as in a filter press, to obtain a filtered oil, which is unsaponified and "free" the filter cake from adherent oil, as by blowing with air or steam, or both.

The filtered oil which we obtain is a clear, non-break, heat-bleachable oil, suitable for use wherever non-break oils are required, as for instance in the paint and varnish industry.

The blown filter cake may be treated dried or undried. To exemplify this, we divided the blown filter cake into two parts. One part was thoroughly dried in an oven to about 0.05% moisture, while the other was not dried at all and contained about 5% moisture. A 500-gram sample of each of these two parts (dried and undried) of the filter cake was separately extracted with about 8 liters of acetone, in five steps, using about 1600 cc. of acetone in each step. The five acetone extracts for each sample were combined (but kept separate from those of the other sample), and the acetone evaporated from it to leave an oily residue in each case. The oily residue thus obtained from the 500 grams of the dried part of the filter cake weighed about 190 grams; and that obtained from the 500 grams of the undried part of the filter cake weighed about 228 grams.

We took a 100-gram sample of each of these two oily residues. We saponified each sample (by the procedure under paragraph 4–$a$ of the General Process above outlined) by adding 200 cc. of 95% ethyl alcohol and 100 cc. of a 40% aqueous solution of potassium hydroxide; and refluxed the whole for about 30 minutes, after which we cooled it to about room temperature. We then added to each sample 100 cc. of water and 200 cc. of 95% ethyl alcohol; and we extracted the resultant soap solution five times in a separatory funnel with one liter of petroleum ether at each extraction, carefully drawing off the ether after each extraction. The five petroleum-ether extracts (of each sample) were combined; and the whole first washed three times with a 20% solution of ethyl alcohol, using about 700 cc. per washing, and then rewashed three times with distilled water, using about 500 cc. per washing. After each washing the wash solution was allowed to separate from the petroleum-ether layer, and drawn off by a separatory funnel. Then the washed combined-petroleum-ether extract (for each sample) was subjected to distillation to drive off the petroleum ether, and to leave a solid residue which consists mainly of crude sterols. The crude sterols thus obtained were recrystallized from 95% ethyl alcohol.

In this manner we obtained approximately 2.11 grams of sterols from the 100 grams of oily residue derived from the undried filter cake from soybean oil, and 2.77 grams of sterols from the 100 grams of oily residue derived from the dried filter cake from soybean oil.

Example 2

Other oils give somewhat similar results by the same general procedure, with the following results in the treatment of the oily residue derived from the undried filter cake:

|  | Per cent |
|---|---|
| From cottonseed oil | 2.54 |
| From corn oil | 10.15 |
| From tall oil | 4.1 |

Example 3

As an alternative treatment, we took 100 grams of each of the oily residues of Example 1, and extracted it by the procedure under paragraph 4–$b$ of the General Process above outlined. In this extraction, we extracted the 100-gram sample of each oily residue with about 50 cc. of methanol, in a continuous extractor; in which the alcohol of the separated extract is continuously evaporated off and returned to the oily residue for further extraction. In this extraction the alcohol carries off from the oily residue most of the sterols present, and some of the oil, and probably nearly all of any soaps which may be present in the oily residue. After the extraction, the extract is subjected to evaporation to drive off the alcohol, which leaves a concentrate of oil that is very rich in sterols. This concentrate as derived from the dried part of the filter cake amounted to about 21 grams, and contained about 2.7 grams (or about 13%) of sterols; while the concentrate as derived from the undried part of the filter cake amounted to about 40 grams and contained about 2.01 grams (or about 5.0%) of sterols.

In each of these two instances the sterols in the concentrate may be separated in large measure from the oils by refrigeration. But some sterols remain in the oil. We can remove those remaining sterols, or remove all of the sterols in case we did not refrigerate it, by saponifying the oily concentrate, and separating the sterols from the saponified product by extraction with ether or petroleum ether as described above for the first two 100-gram samples.

We claim as our invention:

1. The process of obtaining sterols from a sterol-containing vegetable oil, which consists in adding to such oil a saponifying agent in an amount sufficient to neutralize the fatty acids and precipitate the phosphatides but insufficient to saponify the oil, and also adding a filter aid, then separating most of the oil from the solid matter, then extracting said solid matter with an organic solvent which dissolves fats and sterols, and recovering sterols from the extract so obtained.

2. The process of obtaining sterols from a sterol-containing soybean oil, which consists in adding to such oil a saponifying agent in an amount sufficient to neutralize the fatty acids and precipitate the phosphatides but insufficient to saponify the oil, and also adding a filter aid, then separating most of the oil from the solid matter, then extracting said solid matter with an organic solvent which dissolves fats and sterols, and recovering sterols from the extract so obtained.

3. The process of obtaining sterols from a sterol-containing soybean oil, which consists in adding sodium hydroxide to such oil in the proportion of about 0.06% to 0.10% actual NaOH, and also adding a filter aid, then separating most of the oil from the solid matter, then extracting said solid matter with an organic solvent which dissolves fats and sterols, and recovering sterols from the extract so obtained.

4. The process of obtaining sterols from a sterol-containing vegetable oil, which consists in adding to such oil a saponifying agent in an amount sufficient to neutralize the fatty acids and precipitate the phosphatides but insufficient to saponify the oil, and also adding a filter aid, then separating most of the oil from the solid matter, then extracting said solid matter with an organic solvent which dissolves fats and sterols to recover crude sterols therefrom, removing the solvent by evaporation to leave an oily residue, and recovering refined sterols from said oily residue.

5. The process of obtaining sterols from a sterol-containing soybean oil, which consists in adding to such oil a saponifying agent in an amount sufficient to neutralize the fatty acids and precipitate the phosphatides but insufficient to saponify the oil, and also adding a filter aid, then separating most of the oil from the solid matter, then extracting said solid matter with an organic solvent which dissolves fats and sterols to recover crude sterols therefrom, removing the solvent by evaporation to leave an oily residue, and recovering refined sterols from said oily residue.

6. The process of obtaining sterols from a sterol-containing soybean oil, which consists in adding sodium hydroxide to such oil in the proportion of about 0.06% to 0.10% actual NaOH and also adding a filter aid, then separating most of the oil from the solid matter, then extracting said solid matter with an organic solvent which dissolves fats and sterols to recover crude sterols therefrom, removing the solvent by evaporation to leave an oily residue, and recovering refined sterols from said oily residue.

NORMAN F. KRUSE.
ELMER B. OBERG.
WENDELL E. MANN.
HENRY R. KRAYBILL.
KENNETH E. ELDRIDGE.

CERTIFICATE OF CORRECTION.

Patent No. 2,296,794. September 22, 1942.

NORMAN F. KRUSE, ET AL.

It is hereby certified that error appears in the printed specification of the above numbered patent requiring correction as follows: Page 1, first column, line 37, after "unsaponified" insert a semicolon; page 2, second column, line 17, for "Per cent" read --Per cent sterols--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.